Patented Feb. 9, 1954

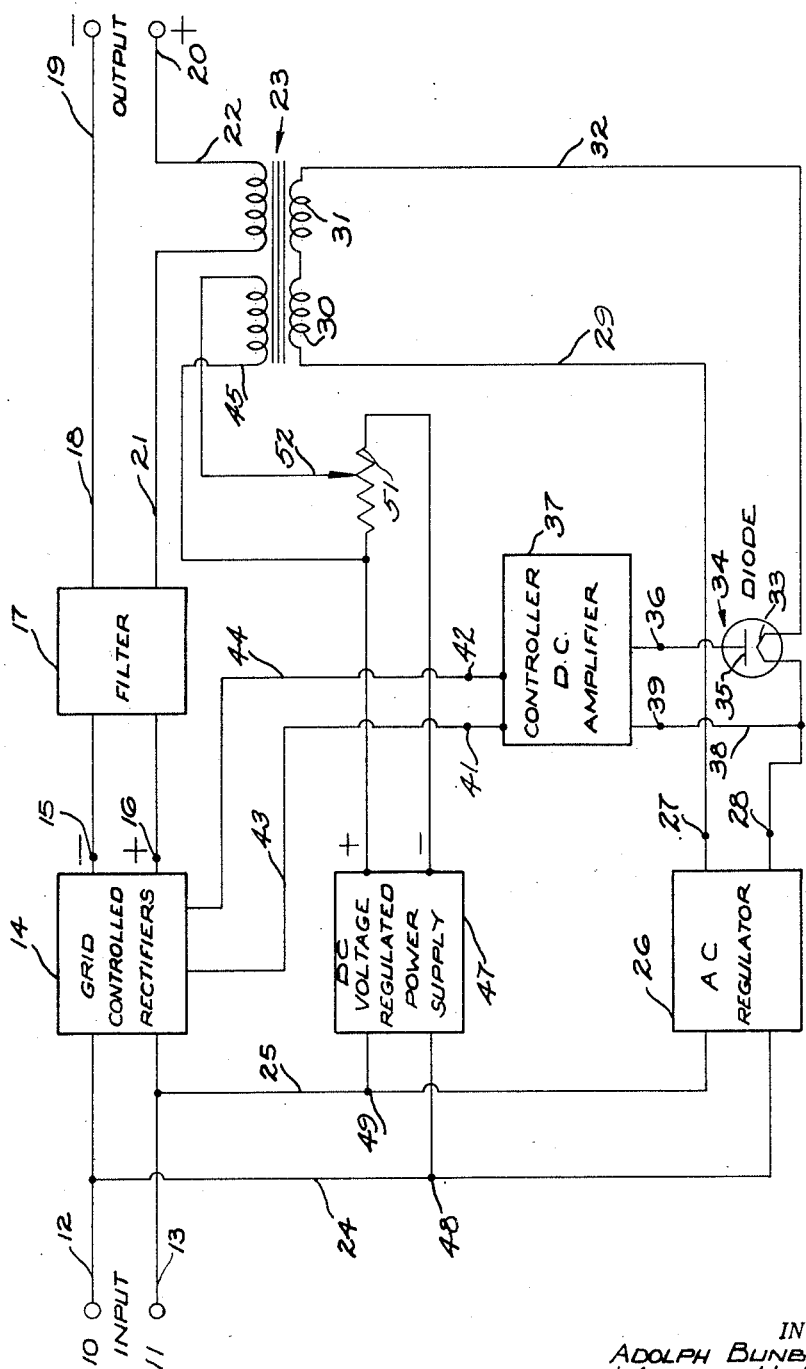

2,668,937

UNITED STATES PATENT OFFICE 2,668,937

CURRENT REGULATOR

Adolph Bunblasky, New Canaan, and William H. Henrich, Norwalk, Conn., assignors to Sorensen & Company, Inc., Stamford, Conn., a corporation of Connecticut Application November 19, 1951, Serial No. 256,992

7 Claims. (Cl. 321—18)

The present invention relates to new and useful improvements in power supplies and has particular relation to a current regulated power supply adapted to maintain a direct current substantially constant within predetermined limits and which is further adapted to provide a regulated direct current over a wide range of output current and voltage magnitudes.

An object of the invention is to provide a current regulator employing a saturable core reactor as a sensing element.

Another object is to provide a current regulator having a saturable core reactor having at least two direct current windings, one of said windings being in series with an output lead of said regulator and the other winding acting as a bias winding connected to a source of direct current potential, whereby the magnitude of the output current may be predetermined by the potential across the bias winding.

Still another object of the invention is to provide a current regulator having a saturable core reactor, a direct current winding thereof being in series with an output lead and having its alternating current winding connected to the filament of a diode whereby changes in the output current are detected by the saturable core reactor and thence translated as a change in the impedance of the diode to in turn vary the voltage on the grids of a rectifier to maintain the desired output current within predetermined limits.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

The figure is a schematic diagram in block form of one embodiment of the invention.

Referring in detail to the drawing, an alternating current input is applied to a pair of terminals 10 and 11 and thence over conductors 12 and 13 to a grid controlled rectifier 14. Although the rectifier 14 is shown as a single block, it is to be understood that the rectifier may comprise as many tubes in multiple as is necessary to provide the desired maximum output current.

The direct current output of the rectifier 14 is developed across a pair of rectifier output terminals 15 and 16 and thence to a suitable filter 17. The filter 17 is of a conventional type and may comprise any suitable elements, such as the usual inductance capacitor combination well-known in the electrical art.

The output from the filter 17 is carried by a lead 18 to a negative output terminal 19 and by another lead 21 through a direct current control winding 22 of a saturable core reactor 23 to a positive output terminal 20. The winding 22 serves as a detecting or sensing element for the regulator and is responsive to changes in the output current. As will become evident later in the description, changes in the current through the winding 22 will actuate the regulator to return the current to normal.

The alternating current input developed across the input terminals 10 and 11 is also carried by a pair of leads 24 and 25 to an alternating current regulator 26. The regulator 26 may be of any desired type and need not be one capable of controlling the output voltage thereof between extremely close limits. For this reason, the regulator 26 is considered conventional and is also shown in block form.

The output of the regulator 26 appears across a pair of terminals 27 and 28. The terminal 27 is connected by a lead 29 to one side of an alternating current winding comprising the coils 30 and 31 of the saturable core reactor 23. The other side of the winding 30 and 31 is thence carried by a lead 32 through a filament 33 of a diode vacuum tube 34 and thence to the terminal 28. Thus, the filament 33 and the alternating current windings 30 and 31 are serially connected across the alternating current regulator terminals 27 and 28.

A plate element 35 of the diode 34 is connected to an input terminal 36 of a direct current amplifier 37 (which in the present instance is used as a controller). One side of the filament 33 is connected through a lead 38 to another input terminal 39 of the direct current amplifier 37. As in the instance of the grid controlled rectifier 14, the filter 17 and the alternating current regulator 26, the direct current amplifier 37 is shown in block form. This is done inasmuch as there are many forms of direct current amplifiers known in the art which will be suitable in the invention herein disclosed.

Briefly, one form of such an amplifier comprises a simple triode vacuum tube having a filter in the grid cathode circuit. If such an amplifier is used in the present embodiment the input terminal 36 would comprise the input side of the filter connected to the grid and the terminal 39 would comprise the input side of the filter connected to the cathode. A direct current output having but a slight ripple would then be developed at the plate of the triode. If desired, the output could then be fed through further stages of amplification as desired.

The amplified direct current output appears across a pair of terminals 41 and 42 of the direct current amplifier 37 and is then applied through a pair of leads 43 and 44 to the grid cathode circuit of the grid controlled rectifier 14.

An understanding of the basic operation of the current regulator may be obtained by considering the circuit as described to this point. The operation of a simple saturable core reactor is well known, basically, such a reactor comprises a direct current winding and an alternating current winding. A current through the direct current winding provides a magnetizing force for the reactor to set up lines of flux. At low values of magnetization, the permeability is relatively high and the inductance of the alternating current winding is correspondingly high thereby limiting the current flowing through that winding.

An increase in the direct current increases the magnetizing force and hence saturation. The permeability thus decreases with a corresponding decrease in the inductance of the alternating current winding. It is therefore evident that the alternating current impedance may be readily controlled inversely with changes in the magnetizing current through the direct current winding.

It is then readily apparent that any changes in the output current flowing in the lead 21 will cause an inverse change in the impedance of the alternating current coils 30 and 31 of the reactor 23. This change in impedance manifests itself by a change in the current flowing through the filament 33 of the diode 34. The impedance of the diode will then also change to vary the amount of current applied to the direct current amplifier 37. The amplified signal is then applied over the leads 43 and 44 to the grid controlled rectifier 14 to vary the voltage output thereof.

Assume specifically that the output current flowing through the lead 21 tends to increase. Then in accordance with the foregoing theory of operation, the impedance of the alternating current coils 30 and 31 will decrease and the current through filament 33 will increase. The increased filament current will result in increased emission and a decrease in the impedance of the diode 34. The voltage appearing across the plate load of the diode will then increase. The increased voltage across the diode plate load is then amplified by the direct current amplifier 37 and the amplified increase is then applied over the conductors 43 and 44 to the grid cathode circuit of the grid controlled rectifier to increase the bias on the rectifiers and hence return the current to normal.

In view of the foregoing it is seen that the current may be controlled within predetermined limits. It is also desirable, however, to provide a means whereby the magnitude of the desired output current may be controlled over a wide range. Such a means is provided in the present invention by providing a bias control winding 45 for the saturable core reactor 23. Direct current for the bias control winding 45 is provided by a voltage regulated direct current power supply 47. An alternating current input for the supply 47 is obtained by a connection from a pair of input terminals 48 and 49 to the alternating current leads 24 and 25. Although not shown in the block form drawing, the direct current plate to filament potential necessary for the diode 34 is provided by the potential source 47. A potentiometer 51 is connected across the direct current output from the power supply 47. The movable arm 52 of the potentiometer 51 is connected to one side of the bias control coil 45, the other side of the bias control coil 45 being connected to one side of the power supply 47.

By changing the position of the movable arm 52 of the potentiometer 51 the current through bias control 45 can readily be changed. This will likewise cause a change in the impedance of the alternating current coils 30 and 31 whereby the impedance of the coils 30 and 31 may be predetermined over a wide range depending on the value of the bias magnetizing force through the bias control coil 45. The particular value of the bias current thus determines the normal operating point on the permeability characteristic of the saturable core reactor 23. Any fluctuations in load current above or below the normal operating point will be corrected for in accordance with the method of operation heretofore described.

Assume it is desired to lower the output current. It is only necessary to adjust the movable arm 52 of the potentiometer 51 so as to increase the magnetizing current through the bias winding 46. This lowers the impedance of the alternating current windings 30 and 31 to increase the current through the filament 33. The resulting increase in the potential across the plate load of element 35 is amplified and applied to the grid circuit of the rectifiers 14. The current output from the rectifiers will be decreased until approximately the same direct current flux density is again obtained in the saturable core reactor.

As the saturable core reactor works at approximately the same point in its characteristic regardless of the output current desired, the reactor does not limit the range of operation of the unit. Furthermore, as grid control rectifiers can be made to operate through a wide range of current and voltage the whole unit will operate through a wide range of current and voltage.

Having thus set forth the nature of our invention, what we claim is:

1. A current regulator adapted to maintain a direct current within predetermined limits, said regulator comprising rectifying means for converting an alternating current into a direct current, control means associated with said rectifying means to control the magnitude of said direct current, a saturable core reactor means having at least two direct current coil means and at least one alternating current coil means, means for applying said direct current through one of said direct current coil means whereby a change in the magnitude of said direct current results in a change in the impedance of said alternating current coil means, vacuum tube means the output thereof being responsive to changes in the impedance of said alternating current coil means, means for applying the output of said vacuum tube means to said control means whereby the output from said rectifying means is maintained substantially constant, means for predetermining the magnitude of said direct current, said means comprising a source of direct current potential, a variable resistance means, and means for applying the voltage from said potential source through said variable resistance means to the other of said direct current coil means of said saturable core reactor means, whereby the current through said direct current coil means can be controlled by said variable resistance means, and whereby the current through said coil means serves to bias the saturable core reactor to determine the magnitude of said output current.

2. A current regulator adapted to maintain a direct current within predetermined limits, said regulator comprising grid controlled rectifying means for converting an alternating current into a direct current, a saturable core reactor means having at least two direct current coil means and at least one alternating current coil means, means for applying said direct current through one of said direct current coil means whereby a change in the magnitude of said direct current results in a change in the impedance of said alternating current coil means, vacuum tube means the output thereof being responsive to changes in the impedance of said alternating current coil means, means for applying the output of said vacuum tube means to the grids of said grid controlled rectifying means, whereby the output from said rectifying means is maintained substantially constant, means for predetermining the magnitude of said direct current, said means comprising a source of direct current potential, a variable resistance means, and means for applying the voltage from said potential source through said variable resistance means to the other of said direct current coil means of said saturable core reactor means, whereby the current through said direct current coil means can be controlled by said variable resistance means, and whereby the current through said coil means serves to bias the saturable core reactor to determine the magnitude of said output current.

3. A current regulator adapted to maintain a direct current substantially constant within predetermined limits, said regulator comprising an alternating current input circuit, rectifying means connected to said input circuit, said rectifying means being adapted to convert alternating current into direct current, control means associated with said rectifying means whereby the output of said rectifying means can be controlled, output circuit means associated with said rectifying means, a saturable core reactor having at least a direct current winding and an alternating current winding, said direct current winding being in said output circuit means, a vacuum tube means having at least a plate and a filament, said filament being in series with said alternating current winding, means for applying an alternating current from said input circuit to said filament through said alternating current winding, whereby a change in the direct current through said output circuit means manifests itself by a change in the impedance of said alternating current winding which in turn changes the current through said filament to change the impedance of said vacuum tube means and the voltage at the plate thereof, and means for applying the voltage at said plate to said aforementioned control means to maintain the output from said rectifying means at a predetermined value.

4. A current regulator adapted to maintain a direct current substantially constant within predetermined limits, said regulator comprising an alternating current input circuit, grid controlled rectifying means connected to said input circuit, said rectifying means being adapted to convert alternating current into direct current, output circuit means associated with said rectifying means, a saturable core reactor having at least a direct current winding and an alternating current winding, said direct current winding being in said output circuit means, a vacuum tube means having at least a plate and a filament, said filament being in series with said alternating current winding, means for applying an alternating current from said input circuit to said filament through said alternating current winding, whereby a change in the direct current through said output circuit means manifests itself by a change in the impedance of said alternating current winding which in turn changes the current through said filament to change the impedance of said vacuum tube means and the voltage at the plate thereof, and means for applying the voltage at said plate to the grids of said grid controlled rectifying means to maintain the output from said rectifying means at a predetermined value.

5. A current regulator adapted to maintain a direct current substantially constant within predetermined limits, said regulator comprising an alternating current input circuit, grid controlled rectifying means connected to said input circuit, said rectifying means being adapted to convert alternating current into direct current, output circuit means associated with said rectifying means, a saturable core reactor having at least two direct current windings and an alternating current winding, one of said direct current windings being connected in series with said output circuit means, a vacuum tube means having at least a plate and a filament, said filament being in series with said alternating current winding, means for applying an alternating current from said input circuit to said filament through said alternating current winding, whereby a change in the direct current through said output circuit means manifests itself by a change in the impedance of said alternating current winding which in turn changes the current through said filament to change the impedance of said vacuum tube means and the voltage at the plate thereof, means for applying the voltage at said plate to the grids of said grid controlled rectifying means to maintain the output current from said rectifying means substantially constant at a predetermined magnitude, means for predetermining the magnitude of said direct current output, said means comprising a source of direct current potential, a variable resistance, and means for applying the voltage from said potential source through said variable resistance to the other direct current coil of said saturable core reactor, whereby the current through said last mentioned direct current coil can be controlled by said variable resistance and whereby the current through said coil serves to bias the saturable core reactor to determine the magnitude of said output current.

6. A current regulator adapted to maintain a direct current substantially constant within predetermined limits, said regulator comprising an alternating current input circuit, grid controlled rectifying means connected to said input circuit, said rectifying means being adapted to convert alternating current into direct current, output circuit means associated with said rectifying means, a saturable core reactor having at least two direct current windings and an alternating current winding, one of said direct current windings being connected in series with said output circuit means, a diode vacuum tube having a plate and a filament, a source of plate potential for said diode, a connection between one side of said filament and one side of said alternating current winding whereby said filament is in series with said winding, means for applying at least a portion of the alternating current from said input circuit to said serially connected filament and alternating current winding, whereby a change in the output current through said direct current winding alters the impedance of the alternating current winding thereby altering the current through said filament, altering the impedance of said diode and altering the voltage developed at the plate of said diode, means for amplifying the change in voltage at said plate, means for applying said amplified voltage to the grids of said grid controlled rectifying means to bias said rectifying means and restore the direct current output to said predetermined magnitude, means for predetermining the magnitude of said direct current output, said means comprising a source of direct current potential, a variable resistance, and means for applying the voltage from said potential source through said variable resistance to the other direct current coil of said saturable core reactor, whereby the current through said last mentioned direct current coil can be controlled by said variable resistance and whereby the current through said coil serves to bias the saturable core reactor to determine the magnitude of said output current.

7. A current regulator adapted to maintain a direct current substantially constant within predetermined limits, said regulator comprising an alternating current input circuit, grid controlled rectifying means connected to said input circuit, said rectifying means being adapted to convert the alternating current input to direct current, a filter circuit connected to the output of said rectifying means, an output circuit from said filter means, a saturable core reactor having at least two direct current windings and an alternating current winding, one of said direct current windings being connected in series with said output circuit, a diode vacuum tube having a plate and a filament, a source of direct current potential adapted to provide plate potential to said diode, a potentiometer connected across said potential source, one side of said potentiometer being connected to one side of the other of said direct current windings, the other side of said winding being connected to the movable arm of said potentiometer, whereby the amount of current flowing through said coil may be controlled by the positioning of said movable arm to bias said reactor to predetermine the magnitude of the output current from said regulator, a connection between one side of said filament and one side of said alternating current winding whereby said filament is in series with said winding, means for applying at least a portion of the alternating current from said input circuit to said serially connected filament and alternating current winding, whereby a change in the output current through said direct current winding alters the impedance of the alternating current winding thereby altering the current through said filament, altering the impedance of said diode and altering the voltage developed at the plate of said diode, means for amplifying the change in voltage at said plate, and means for applying said amplified voltage to the grids of said grid controlled rectifying means to bias said rectifying means and restore the direct current output to said predetermined magnitude.

ADOLPH BUNBLASKY.
WILLIAM H. HENRICH.

References Cited in the file of this patent
UNITED STATES PATENTS

| Number | Name | Date |
| --- | --- | --- |
| 1,834,416 | Osgood | Dec. 1, 1931 |
| 1,963,093 | Logan | June 19, 1934 |
| 2,503,880 | Mah | Apr. 11, 1950 |
| 2,561,329 | Ahlen | July 24, 1951 |
| 2,573,255 | Forsell | Oct. 30, 1951 |
| 2,617,973 | Wolff et al. | Nov. 11, 1952 |